United States Patent
Kauo et al.

[11] Patent Number: 5,263,115
[45] Date of Patent: Nov. 16, 1993

[54] PTC ELECTRIC HEATING ELEMENT ASSEMBLY

[75] Inventors: Pin-Win Kauo; Ching-Iuan Sheu; Yun-Tien Chen, all of Hsinchu; Suh-Yuh Cheng, Taichung, all of Taiwan

[73] Assignee: Industrial Technology Research Institute, Taiwan

[21] Appl. No.: 765,538

[22] Filed: Sep. 25, 1991

[51] Int. Cl.⁵ .................. F24C 7/10; F27D 11/00; H05B 1/02
[52] U.S. Cl. ................. 392/444; 219/505; 219/541; 219/386
[58] Field of Search ........... 219/517, 505, 530, 540, 219/541, 385, 386; 338/22 R, 328, 256, 249; 361/104; 392/441, 444

[56] References Cited
U.S. PATENT DOCUMENTS

| | | | |
|---|---|---|---|
| 2,251,411 | 8/1941 | Metzger | 392/444 |
| 4,253,007 | 2/1981 | Dannatt | 219/216 |
| 4,284,877 | 8/1981 | Abura et al. | 338/22 R |
| 4,324,974 | 4/1982 | Steiner | 219/553 |
| 4,337,282 | 4/1982 | Nauerth | 219/541 |
| 4,628,189 | 12/1986 | Danko | 219/532 |
| 4,689,878 | 9/1987 | Beauregard et al. | 219/505 |
| 4,730,103 | 3/1988 | Hawkins | 219/541 |

Primary Examiner—Bruce A. Reynolds
Assistant Examiner—Michael D. Switzer
Attorney, Agent, or Firm—Scully, Scott, Murphy & Presser

[57] ABSTRACT

An improved PTC electric heating element assembly comprises a heating element of a ceramic material with positive temperature coefficient, two insulating elements with different thickness, and four metal sheets, which are arranged in a stack to firmly join together by a fastening means fixed on the bottom of a container. The opposite sides of the heating element are contacted by metal sheets having electrodes which are connected to electric wires to effectively conduct the heat produced to the container.

4 Claims, 8 Drawing Sheets

PTC ELECTRIC HEATING ELEMENT ASSEMBLY

BACKGROUND OF THE INVENTION

1. Field of the Invention

This invention relates to an improved PTC electric heating element assembly for heating a container. The PTC electric heating element assembly comprises a heating element of a ceramic material with positive temperature coefficient, two insulating elements with different thickness, and four metal sheets, which are arranged in a stack by passing through a headless bolt welded on the bottom of a container to firmly join them together. The opposite sides of the heating element are contacted by metal sheets having electrodes which are connected to electric wires connected to electric power source.

2. Description of the Prior Art

In conventional electrical heating appliances, most of the electric heating elements are electric heating wires, which serve as electric heating source. However, the electric heating wires have several disadvantages such as the heating efficiency which is unsatisfactory, causing the electric heating wires to oxidize so that the life is shortened, and making it necessary to add a temperature controller for controlling the heating temperature. As is well known, the conversion efficiency of electric heating from electric heating source is about 40%, and the resistance in the electric heating wire is kept steady the electric heating wire is heated so that it continuously consumes electricity without increasing the conversion efficiency of electric heating. Besides, the heating temperature increases at a gradual rate (i.e. it takes long time to heat the electric wire to a certain temperature) since the electric heating wire needs to be preheated during the heating procedure. In order to overcome these disadvantages, PTC electric heating elements are increasingly used for heating purpose. Although the PTC electric heating elements do not have the above-mentioned disadvantages, the prerequisite for practical usage of the PTC heater demands assembly of the PTC electric heating member in a suitable manner to attain good electrical insulation and thermal conductivity.

For example, U.S. Pat. No. 4,324,974 discloses a heating element assembly with a PTC electric heating element for insertion in a recess of a heater, wherein two opposite sides of the heating element are contacted by planar electrodes and give off the heat produced through the electrodes and planar sheets of insulating material covering the same to two heat-absorbing surfaces of the heater. In particular, the sheets of insulating material are coated on their side facing the heating element over a large area with solder and are soldered to the electrodes. U.S. Pat. No. 4,327,282 shows an electrical resistance heating element comprising at least one PTC heating conductor arranged in sandwich form between contact plates. The components are held together elastically by a series of U-shaped clips or U-shaped strips holding the edges of the contact plates. U.S. Pat. No. 4,730,103 shows a compact resistor heater device comprising a PTC resistor body, electrical lead-in wires being bonded to each side of the resistor body, and a heat sink used for disposing the resistor body and the wires thereon, being encapsulated with a thermally conductive sheet.

Unfortunately, the drawback of many of the aforementioned electric heating assemblies is that they either lack the ability to change for different electric heating demands or, as in the case of the heating element disclosed in U.S. Pat. No. 4,327,282, they will be loose for a certain time due to elastic fatigue of the securing means.

SUMMARY OF THE INVENTION

It is therefore an object of this invention to provide an improved PTC electric heating element assembly which provides no such drawbacks as mentioned above.

Another object of the present invention is to provide an improved PTC electric heating element assembly which is easily assembled in a stack by passing through a headless bolt welded on the bottom of a container to firmly join them together so that the PTC electric heating element can be easily changed if damaged.

A further object of the present invention is to provide an improved PTC electric heating element assembly which provides instant heating and thermostatic and electricity-saving efficiency.

These and other objects, advantages and features of the present invention will be more fully understood and appreciated by reference to the written specification and appended drawings.

DETAILED DESCRIPTION OF THE INVENTION

Figure 1:
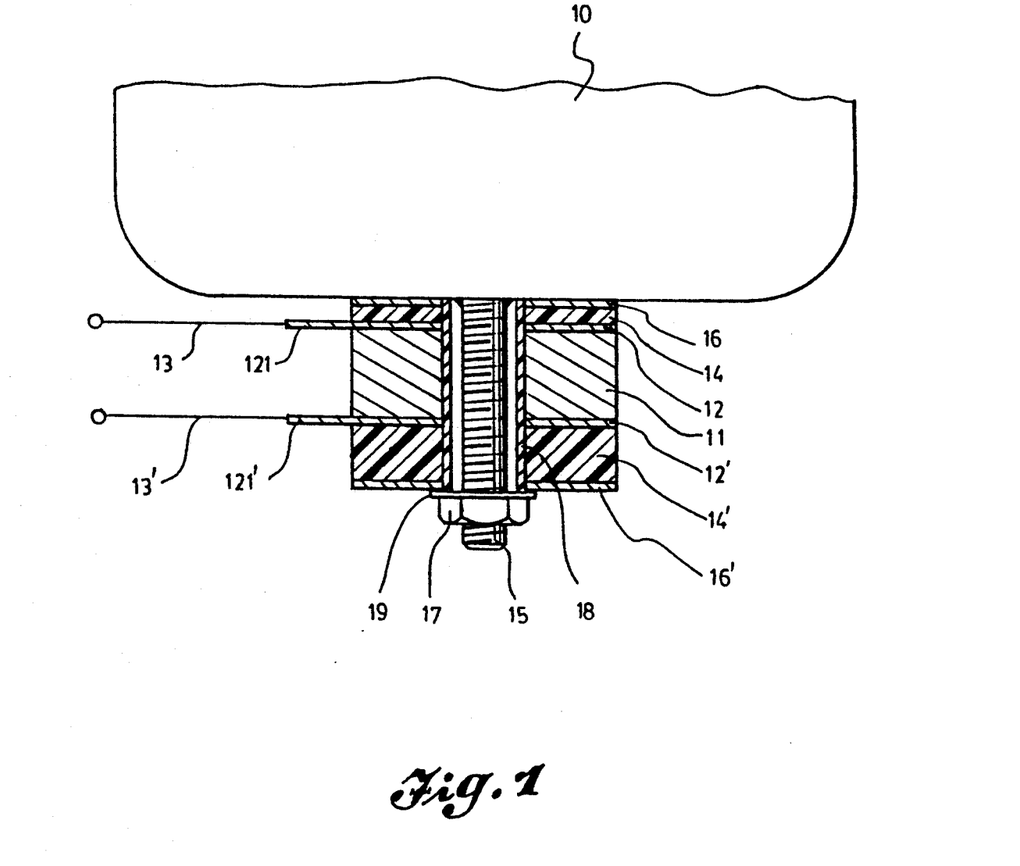
FIG. 1 is a sectional view illustrating a PTC electric heating element assembly in accordance with the present invention assembled on a headless bolt welded on the bottom of a container.
Figure 2:
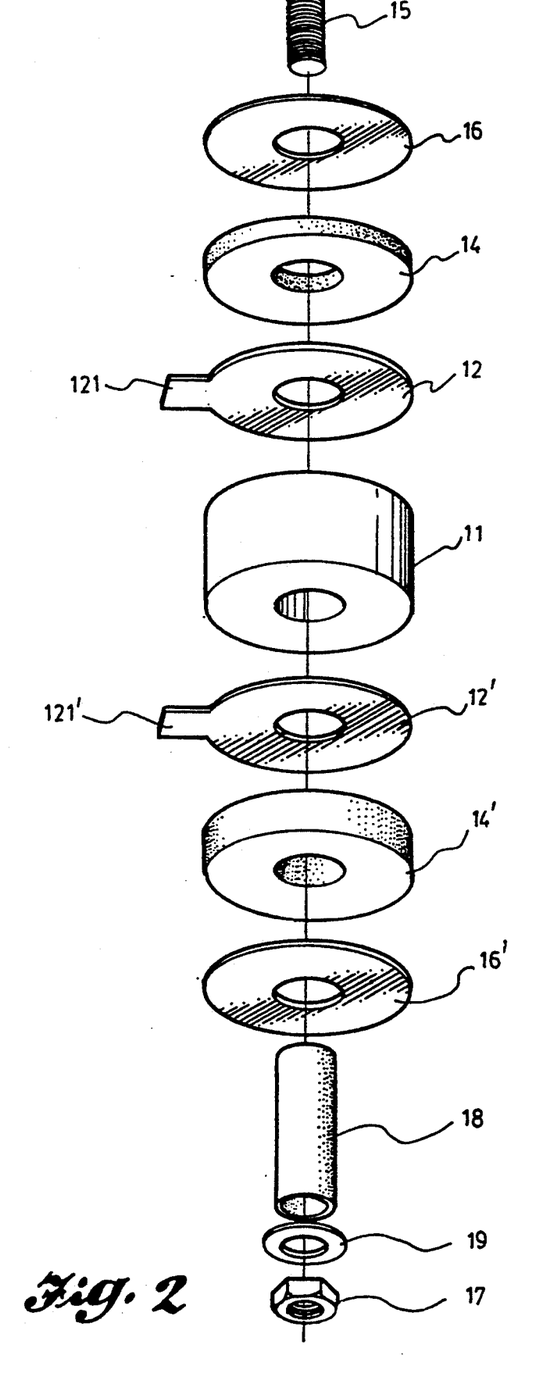
FIG. 2 is an exploded view illustrating component parts of a PTC electric heating element assembly in accordance with the present invention.
Figure 3:
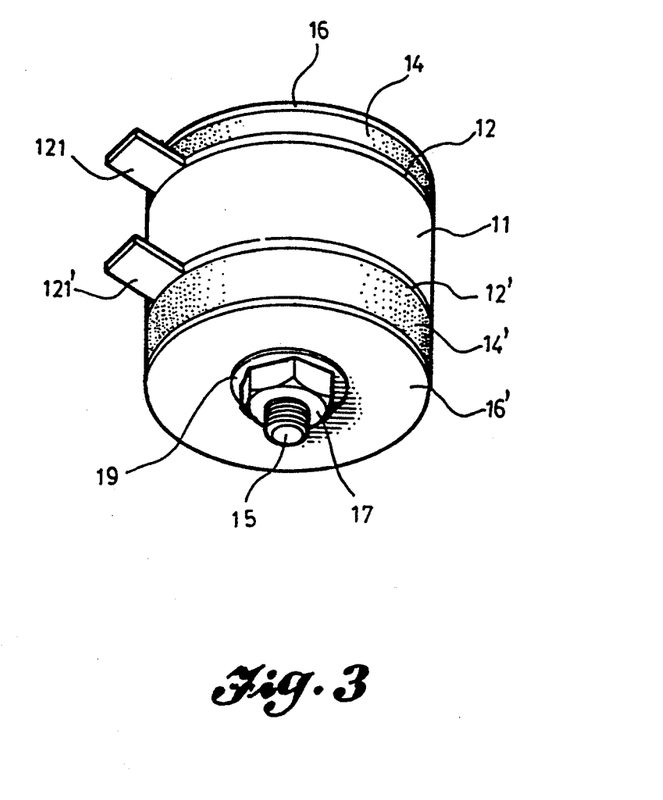
FIG. 3 is a perspective view of a PTC electric heating element assembly in accordance with the present invention.

Referring now to FIGS. 1-3, an improved PTC electric heating element assembly comprises a heating element 11 of a ceramic material with positive temperature coefficient, two insulating elements 14 and 14' with different thickness, and four metal sheets 12, 12', 16 and 16', which are arranged in a stack, and preferably, annular disks in shape with the same inside/outside diameters. The opposite sides of the heating element 11 come into contact with metal sheets 12 and 12' provided with electrodes 121 and 121' extending from the edges thereof. Electric wires 13 and 13' are attached to electrodes 121 and 121' for connection to a power source (not shown). A first insulating element 14, for example, of aluminum oxide ($Al_2O_3$), is disposed on the upper surface of the first metal sheet 12. A second insulating element 14', likewise, of aluminum oxide ($Al_2O_3$), is thicker than the first insulating element 14 and comes into contact with the lower surface of the second metal sheet 12'. A third metal sheet 16 is disposed on the upper surface of the first insulating element 14 and a forth metal sheet 16' comes into contact with the lower surface of the insulating element 14'. Such assembly as mentioned above passes through a headless bolt 15 welded on the bottom of a container 10 and an insulating sleeve 18 is inserted between the assembly and the headless bolt 15 for good insulation. Then, the assembly is firmly joined together by a nut 17 screwed on the headless bolt 15. A washer 19 can be disposed between the forth metal sheet 16' and the nut 17 to improve the tightness of the assembly. Thus, when a suitable voltage is added to the electric wires 13 and 13', the heating element 11 will rapidly heat up and effectively conduct the heat produced to the container 10 through the thinner insulating element 16 and the third metal sheet 16. It should be noted that the thinner insulating element 14 is in proximity to the bottom of the container 10 because of its low heat loss, and the material of the thicker insulating element 14' can be replaced by cordierite ($Mg_2(Al_4Si_5O_{18})$), which has better heat isolation than that of the aluminum oxide.

Figure 4:
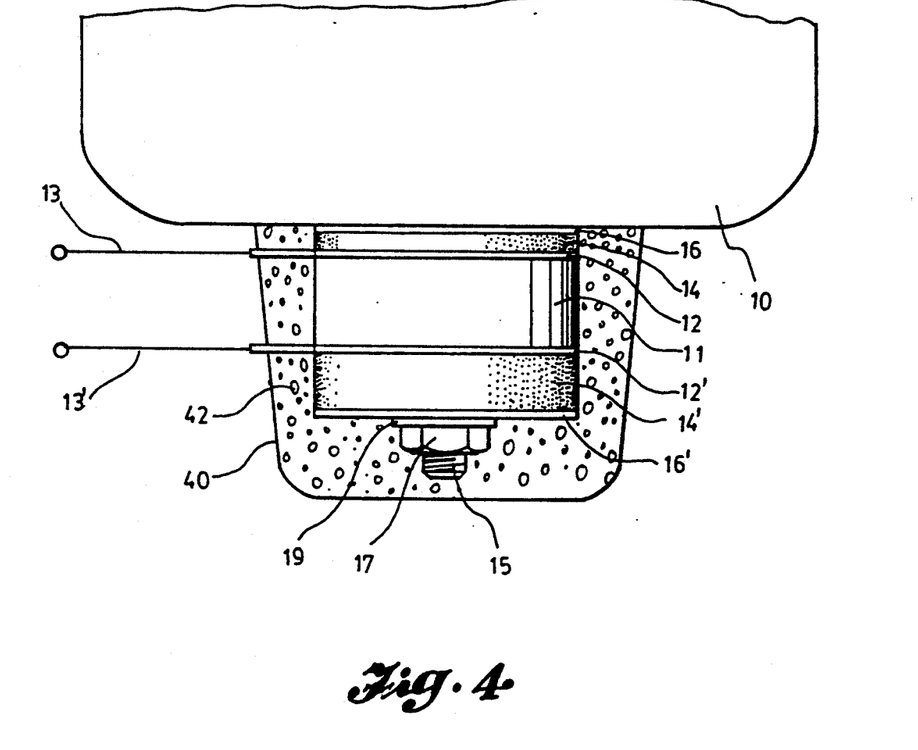
FIG. 4 is a schematic view illustrating a PTC electric heating element assembly in accordance with the present invention covered by a housing and filled with heat-insulating materials therebetween.

As shown in FIG. 4, the PTC electric heating element assembly in accordance with the present invention is covered by a housing 40 and heat-insulating materials 42 are filled therebetween to prevent heat from dissipating into the surrounding environment and to assure the best heat insulation.

EXAMPLE

The following tests are offered to show the characteristics of the improved PTC electric heating assembly in accordance with the present invention by connecting a power source to the electrodes.

Figure 5:
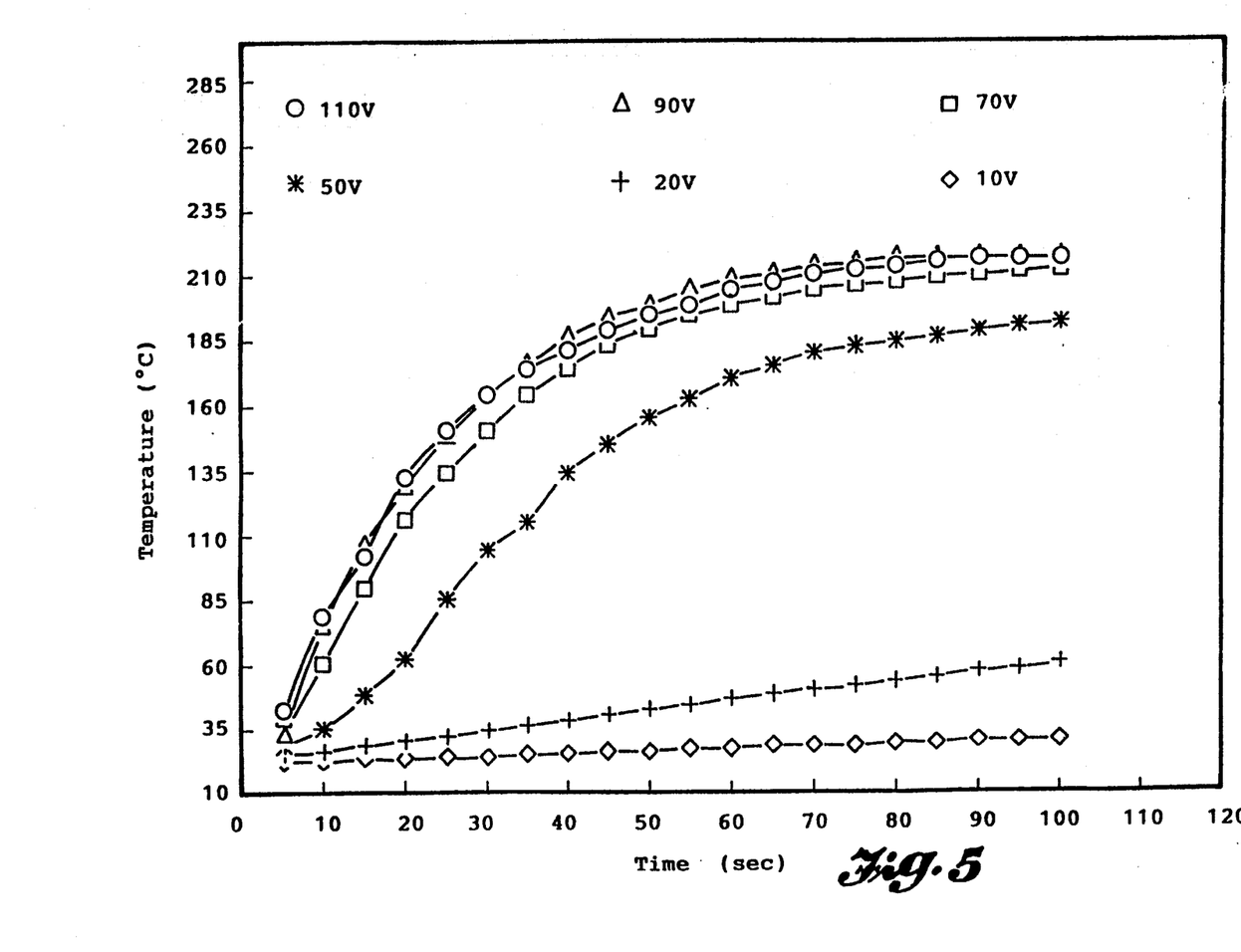
FIG. 5 shows the results of the relation between temperature and time in different voltages in the temperature-rise test as illustrated in the example.

(A) Temperature-Rise Test:

The heating element is energized with different voltages under the same initial conditions to measure the temperatures of the surface thereof by a thermocouple. As shown in FIG. 5, satisfactory temperature-rise rates are attained when power source of approximate 70 volts is applied.

Figure 6:
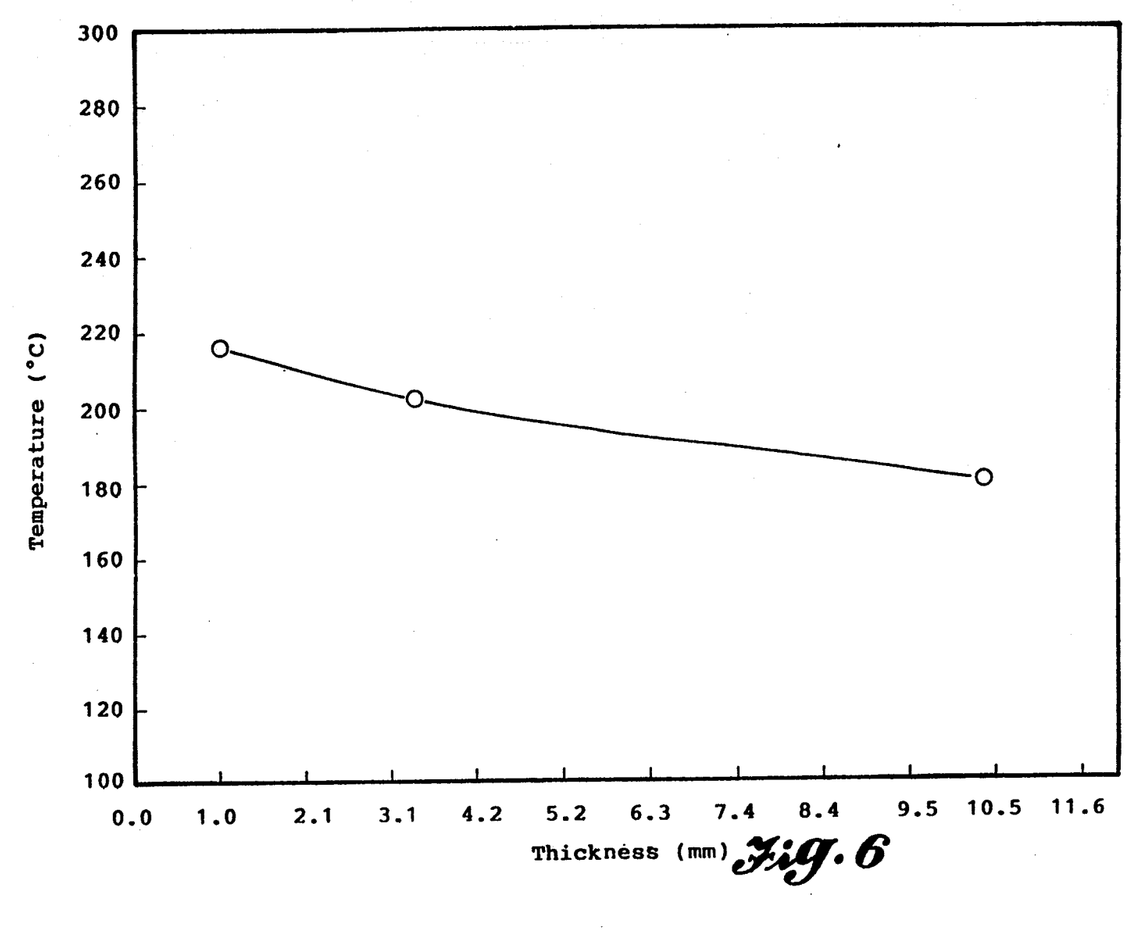
FIG. 6 shows the results of the relation between temperature and thickness in the heat loss test as illustrated in the example.

(B) Heat Loss Test:

Aluminum oxide insulating elements with different thickness are heated. And the surface temperatures of the elements are measured when the temperatures of the surface are stabilized. As shown in FIG. 6, when the thickness of the aluminum oxide insulating element is below 1.0 mm, it hardly produces any heat loss, but, the heat conductivity is in reverse proportion to the thickness of the aluminum oxide insulating element.

Figure 7:
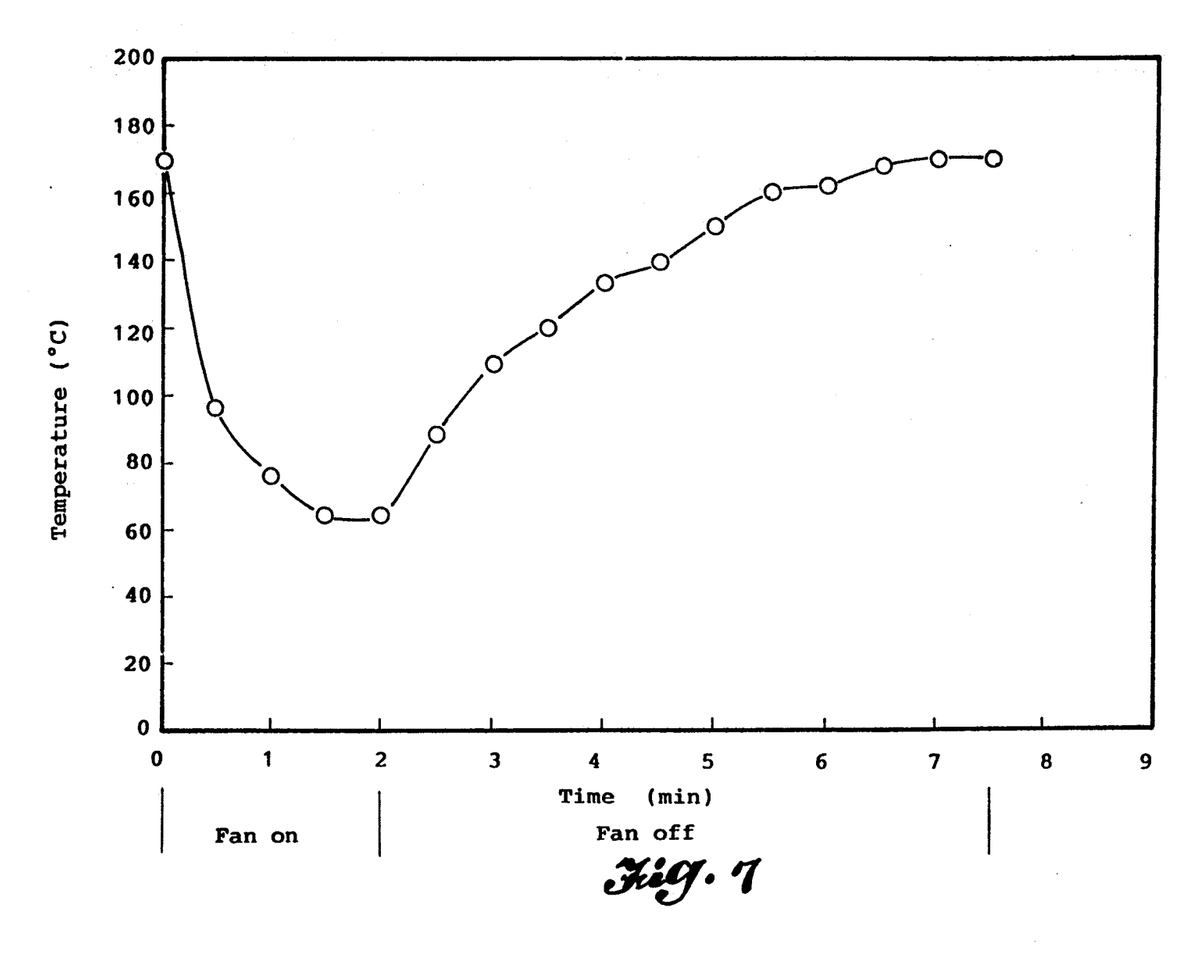
FIG. 7 shows the results of the relation between temperature and time in the thermostatic test as illustrated in the example.

(C) Thermostatic Test:

The heating element is heated to a saturated temperature, and a fan is used to cool the heating element such that the surface temperature reaches 60° C. and then is turned off. As shown in FIG. 7, the heating element will return to the saturated temperature after a certain period of time, because of its thermostat characteristic.

Figure 8:
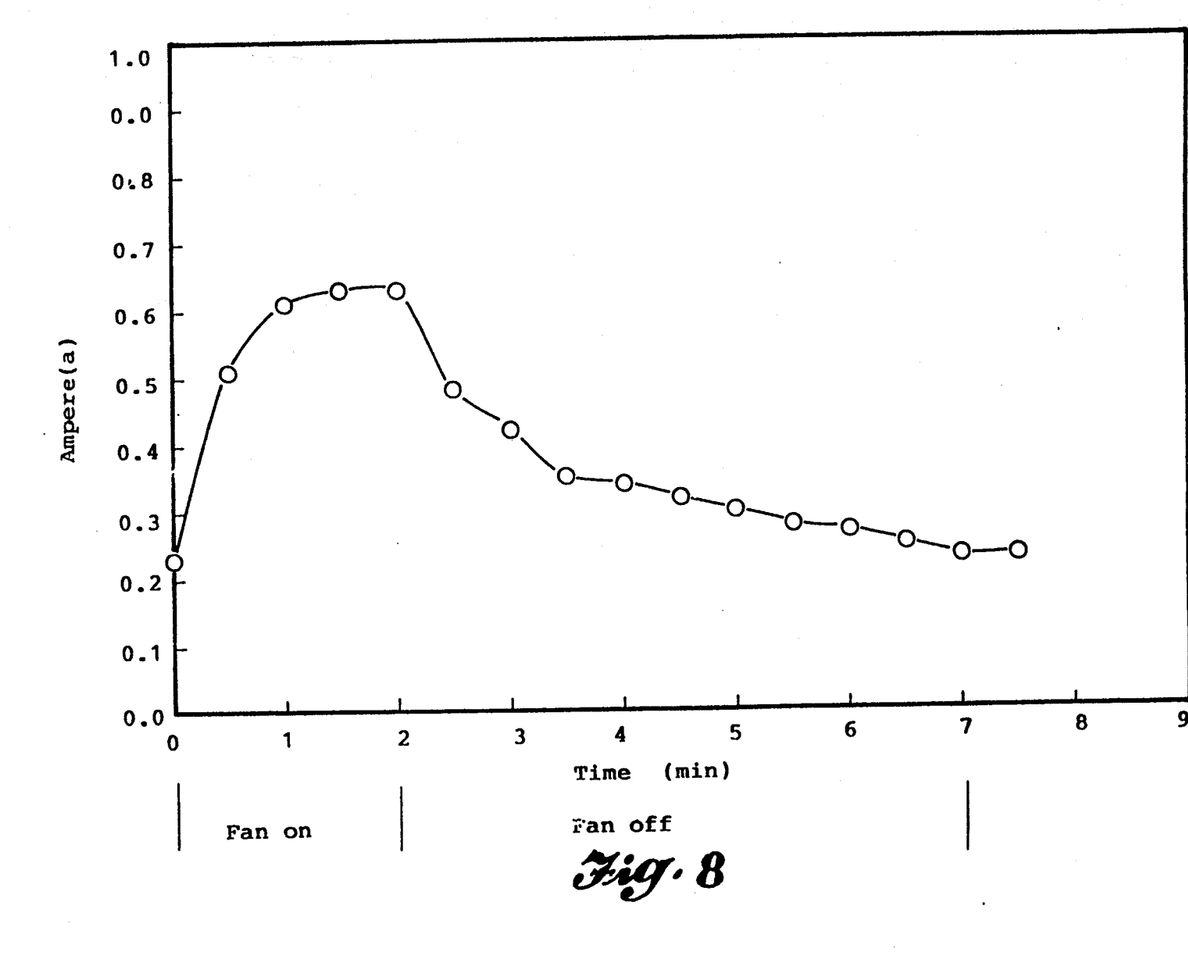
FIG. 8 shows the results of the relation between ampere and time in the power consumption test as illustrated in the example.

(D) Power Consumption Test:

When the heating element is heated to a saturated temperature, a fan is then used to cool the heating element. As shown in FIG. 8, the supplying current will increase to overcome the decreasing of the temperature of the surface of the heating element, which is affected by the outside. When the temperature of the surface of the heating element rises to its saturated temperature again, the consumption of electricity reduces accordingly. It is proved that the power consumption of the heating element is variable.

Of course it is understood that the above is merely a preferred embodiment of the invention and that various changes and alterations can be made without departing from the spirit and broader aspects thereof as set forth in the appended claims.

We claim:

1. A PTC electric heating element assembly for heating a container comprising:

a heating element of a ceramic material with a positive temperature coefficient having two opposite sides;

a first pair of metal sheets removably disposed on the opposite sides of said heating element, each of said metal sheets being provided with an electrode extending from an edge thereof to connect a power source;

a pair of insulating elements, each removably disposed on one side of each of the first pair of metal sheets respectively;

a second pair of metal sheets, each removably disposed on one side of each of the insulating elements respectively; and fastening means fixed on a bottom of the container and coupled to said heating element, said first and second pairs of metal sheets and said pair of insulating elements for removably securing the assembly in place.

2. A PTC electric heating element assembly as claimed in claim 1, wherein said insulating elements consist of aluminum oxide.

3. A PTC electric heating element assembly as claimed in claim 1, wherein the fastening means is a headless bolt welded on the bottom of the container to firmly join the assembly by a nut screwed on the headless bolt.

4. A PTC electric heating element assembly as claimed in claim 3, further comprising an insulating sleeve inserted between the assembly and the headless bolt.

* * * * *